United States Patent

[11] 3,561,706

| [72] | Inventor | James Martin, Southlands Manor, Southlands Road, Denham near Uxbridge, Middlesex, England |
|---|---|---|
| [21] | Appl. No | 830,292 |
| [22] | Filed | June 4, 1969 |
| [45] | Patented | Feb. 9, 1971 |
| [32] | Priority | June 6, 1968 |
| [33] | | Great Britain |
| [31] | | 27,064/68 |

[54] PARACHUTE RELEASE CONTROL HANDLE
6 Claims, 3 Drawing Figs.

[52] U.S. Cl............................................. 244/149, 74/2; 294/83
[51] Int. Cl........................................................ B64d 17/52
[50] Field of Search............................................ 74/2, 527; 244/149; 294/83

[56] References Cited
UNITED STATES PATENTS

| 3,120,365 | 2/1964 | Gutacker...................... | 244/149 |
| 3,193,223 | 7/1965 | Davis............................. | 74/2X |

Primary Examiner—Evon C. Blunk
Assistant Examiner—Johnny D. Cherry
Attorney—Kurt Kelman

ABSTRACT: A releasable locking mechanism particularly suitable for a parachute ripcord comprising first and second intertelescoped parts adapted respectively to be coupled to the inner and outer of a control cable, the two parts normally being locked against relative movement by a detent which, when released by a lever, permits movement between the two parts and thus movement between the inner and outer of the cable.

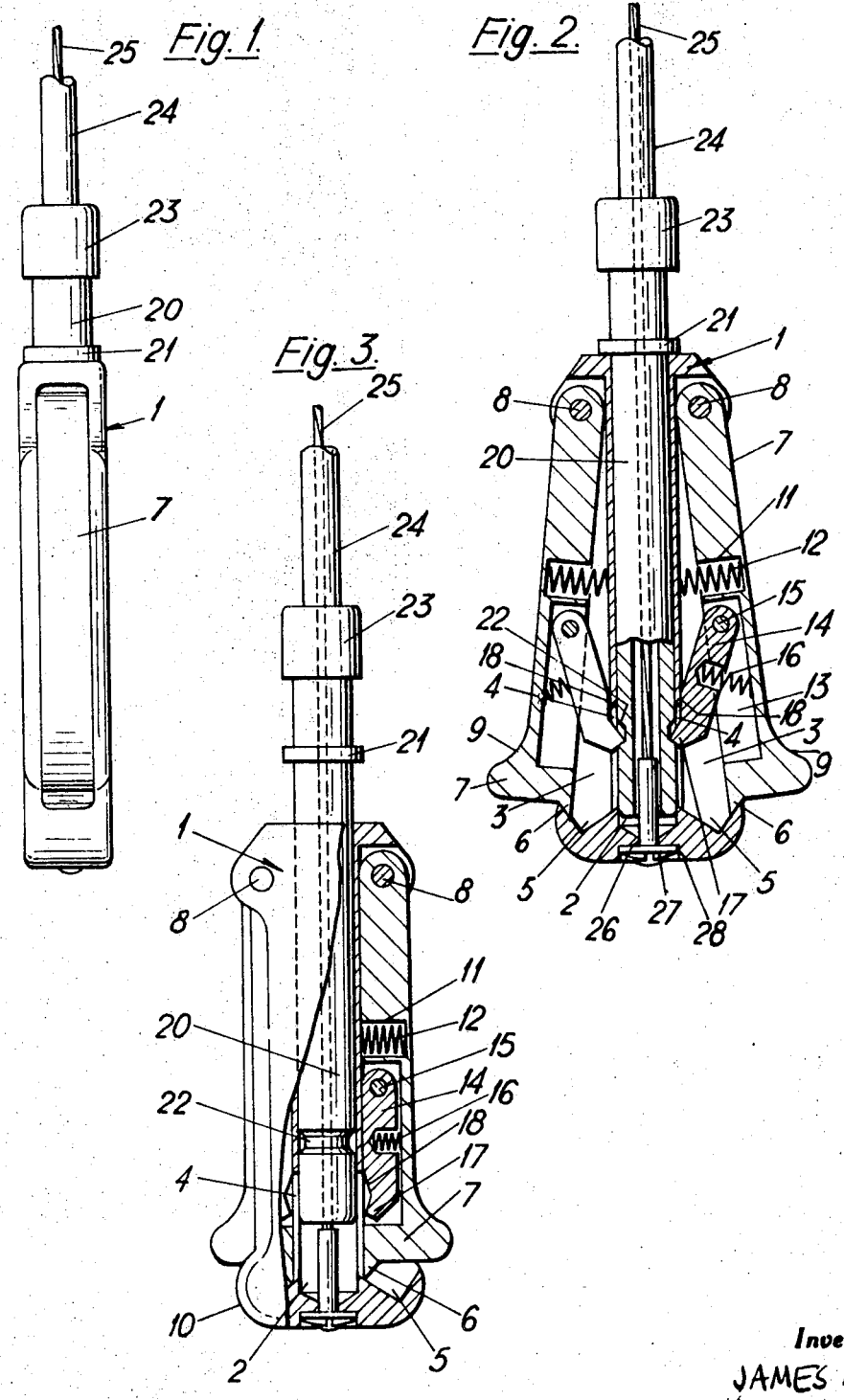

PARACHUTE RELEASE CONTROL HANDLE

This invention concerns releasable locking mechanism for cables, wires, cords, rods or the like (all hereinafter referred to as "cords") and in particular concerns a mechanism which after it is released may be used to actuate a parachute ripcord.

As is well known, parachutes have been opened in response to actuation of a wide variety of mechanisms and probably the most common system which has been adopted is that of the D-ring which is grasped by the wearer of the parachute and which, when pulled by the wearer, withdraws one or more pins which are provided normally to retain the parachute pack in a closed condition with the result that the pack is opened and the parachute released.

One object of this invention is to provide means which are equivalent to the D-ring in a well-known parachute pack but which cannot be easily accidentally actuated to release a parachute controlled thereby.

Thus according to this invention there is provided a releasable locking mechanism, particularly suitable for a parachute ripcord, such mechanism comprising a first part having a first tubular portion in which a second tubular portion of a second part is slidably housed, the first part being adapted to be coupled to a cord extending through said second tubular portion, a lever being pivotally coupled to said first part and movable towards said first and second tubular portions, said lever pivotally carrying an abutment biased into a position in which a first abutment part engages said first tubular portion whilst a second abutment part engages said second tubular portion so that relative movement of the first and second tubular portions in at least one direction along their longitudinal axes is normally prevented, movement of said lever from an inoperative position in a direction towards said cylindrical portions into an operative position causing angular movement of the abutment and disengagement of said abutment from said second tubular portion thereby permitting axial movement to occur between said first and second tubular portions and between the first and second parts.

According to one feature of the invention means, in addition to the means provided to bias the detent into engagement with the tubular portions, may be provided to bias the lever to its inoperative position away from the tubular portions of the mechanism.

Advantageously the detent may be shaped so that when the lever is in its inoperative position the second abutment part, conveniently formed by a nose on a free end portion of the abutment, may engage the second tubular portion and the first abutment part may be formed by a surface of the abutment which lies parallel to, and in engagement with, the first tubular portion.

Conveniently the first tubular portion may be provided with an aperture through which said second abutment part may pass, and the second tubular portion may be provided with a circumferential groove into which said second abutment part may extend.

Expediently a pair of levers disposed diametrically opposite one another on the mechanism, and each carrying an abutment, may be provided.

In order that the invention may be more readily understood, one embodiment of releasable locking mechanism for a parachute ripcord will now be described by way of example, and with reference to, the accompanying drawings in which:

FIG. 1 is an elevational view of the mechanism in accordance with this invention;

FIG. 2 is a sectional view through the mechanism of FIG. 1; and

FIG. 3 is a further view, partly sectioned, of the mechanism after the latter has been released.

In this embodiment the mechanism comprises two basic parts. The first part 1 is a generally flat rectangular body which is provided with a central, longitudinally extending, blind axial bore 2 which constitutes a first tubular portion. Opposite edge portions of the body are slotted at 3 and an aperture 4 is provided in the base of each such slot to place such slots in communication with the bore 2. Such apertures 4 are provided towards a lower end of each of the slots 3; that is the end nearer the blind end of the bore 2. Such lower end of each slot 3 is recessed at 5 to receive a projection 6 constituting a stop and this projection extends from the lower end portion of a lever 7 which is pivotally connected at its opposite, upper end to the first part 1 by a pivot pin 8 extending transversely of the upper end of the slot 3. Each lever 7 is therefore partly telescoped within its respective slot 3. These levers 7 are outwardly and downwardly flared at 9 towards their lower ends as is the body (at 10 to permit the levers 7 and the body 1 to be grasped easily and securely.

The inner surface of each lever 7 which lies within the slot 3 is provided, substantially midway therealong, with a counterbore 11 in which is located a helical compression spring 12, one end portion of which engages the foot of the bore 11 and the other end portion of which engages the first tubular portion with the result that the lever 7 is biassed away from the first tubular portion to an inoperative position with the projection or stop 6 on the lever 7 engaging the edge of the recessed portion 5 of the lower end of the slot 7.

Positioned immediately below the counterbore 11 in each lever 7 is a rectangular rebate 13 in which is located an abutment 14 pivotally connected at its end nearer the counterbore 11 to such lever 7 by a pin 15. Such abutment 14 is biassed, by means of a second helical compression spring 16, into a position away from the rebate 13 and towards said first tubular portion of the first part 1. The abutment 14 on each lever 7 is provided with an abutment part in the form of a nose 17 which extends through the aperture 4 in the base of the slot 3 containing the same, a flat surface 18, which constitutes another abutment part, is positioned immediately above this nose 17 and lies in engagement with, and parallel to, the base of said slot 3.

The second part of the mechanism comprises a tube 20 externally dimensioned so that it may be introduced into the bore 2 of the first part as a sliding fit. Such tube 20 is provided with a radially extending flange 21 which limits the extent of permitted insertion of the tube 20 into the bore 2 of such first part. This second part is provided, towards its end which lies within the bore 2, with a circumferential groove 22 in which the noses 17 of the detents 14 passing through the apertures 4 in the first part lie. The distance between said circumferential groove 22 and the radially extending flange 21 is such that the radially extending flange 21 engages the upper end of the first part when the noses 17 are in engagement with the circumferential groove 22. An appropriate coupling generally designated 23 for coupling the outer sheath of, for example, a "Bowden" type cable is provided on the end of the second part remote from said circumferential groove 22.

When a "Bowden" type cable is connected to the mechanism described above the outer sheath thereof 24 is connected to the said second part by said coupling 23 whereas the inner cable portion designated 25 extends through the second part, i.e. the tube 20 and is connected to the lower end of the first part. Any method of interconnection of the cable to the first part may be adopted but conveniently the lower end portion of the bore 2 of the first part is counterbored at 26 and the cable is passed through the counterbore 26 and may carry a swaged or otherwise connected head 27 which is positioned in a recess 28 provided at the mouth of the counterbore 26.

It will be understood that when the levers are biassed by the helical compression springs 12 into their inoperative positions the noses 17 of the abutments prevent the first part 1 from being moved in a separating direction axially of the second part 20. However, when the mechanism is grasped and the levers moved fully inwardly of the body of the mechanism against the action such helical compression springs 12, the abutments 14 are forced to move about their pivot pins 8 against the action of the helical compression springs 16 and as a result of engagement of the first abutment parts, namely the flat surfaces 18, with the first tubular portion 20, the second abutment parts or noses 17 will be withdrawn from the circumferential groove 22 in the second part. At this stage the first part 1 may be drawn axially of the second part 20 and as a result the inner cable part 25 of the "Bowden" type cable may be drawn axially with respect to its outer sheath 24. The opposite end of the "Bowden" type cable would be connected to a parachute pack in any well-known manner.

It will be understood from the above description that the above described embodiment of mechanism provides for easy, rapid and reliable release of the mechanism but because it is necessary to have both the levers fully depressed before relative movement between the first and second parts can take place, such mechanism is unlikely to be actuated accidentally in any circumstances.

I claim:

1. A releasable locking mechanism, particularly suitable for a parachute ripcord, such mechanism comprising:
   a first part having a first tubular portion;
   a second tubular portion of a second part slidably housed within said first tubular portion;
   the first part being adapted to be coupled to a cord extending through said second tubular portion;
   a lever being pivotally coupled to said first part and movable towards said first and second tubular portions;
   an abutment biassed into a position in which a first abutment part engages said first tubular portion being pivotally carried by said lever; and
   a second abutment part engaging said second tubular portion;
   the arrangement being such that relative movement of the first and second tubular portions in at least one direction along their longitudinal axes is normally prevented, movement of said lever from an inoperative position in a direction towards said cylindrical portions into an operative position causing angular movement of the abutment and disengagement of said abutment from said second tubular portion thereby permitting axial movement to occur between said first and second tubular portions and between the first and second parts.

2. A mechanism according to claim 1, wherein means are provided to bias the lever to its inoperative position away from the tubular portions of the mechanism.

3. A mechanism according to claim 1, wherein the detent is shaped so that when the lever is in its inoperative position the second abutment part engages the second tubular portion and the first abutment part is formed by a surface which lies parallel to, and in engagement with, the first tubular portion.

4. A mechanism according to claim 1, wherein said second abutment part is provided by a nose on a free end portion of the abutment.

5. A mechanism according to claim 1, wherein the first tubular portion has structure defining an aperture through which the second abutment passes and the second tubular portion has structure which defines a circumferential groove in which said second abutment part extends.

6. A parachute pack provided with a releasable locking mechanism, such mechanism comprising:
   a first part having a first tubular portion;
   a second tubular portion of a second part slidably housed within said first tubular portion;
   the first part being adapted to be coupled to a cord extending through said second tubular portion;
   a lever being pivotally coupled to said first part and movable towards said first and second tubular portions;
   an abutment biassed into a position in which a first abutment part engages said first tubular portion being pivotally carried by said lever; and
   a second abutment part engaging said second tubular portion;
   the arrangement being such that relative movement of the first and second tubular portions in at least one direction along their longitudinal axes is normally prevented, movement of said lever from an inoperative position in a direction towards said cylindrical portions into an operative position causing angular movement of the abutment and disengagement of said abutment from said second tubular portion thereby permitting axial movement to occur between said first and second tubular portions and between the first and second parts.